Dec. 10, 1963     T. DRESSER     3,113,982
PROCESS FOR DURENE RECOVERY BY CRYSTALLIZATION
Filed Sept. 1, 1959
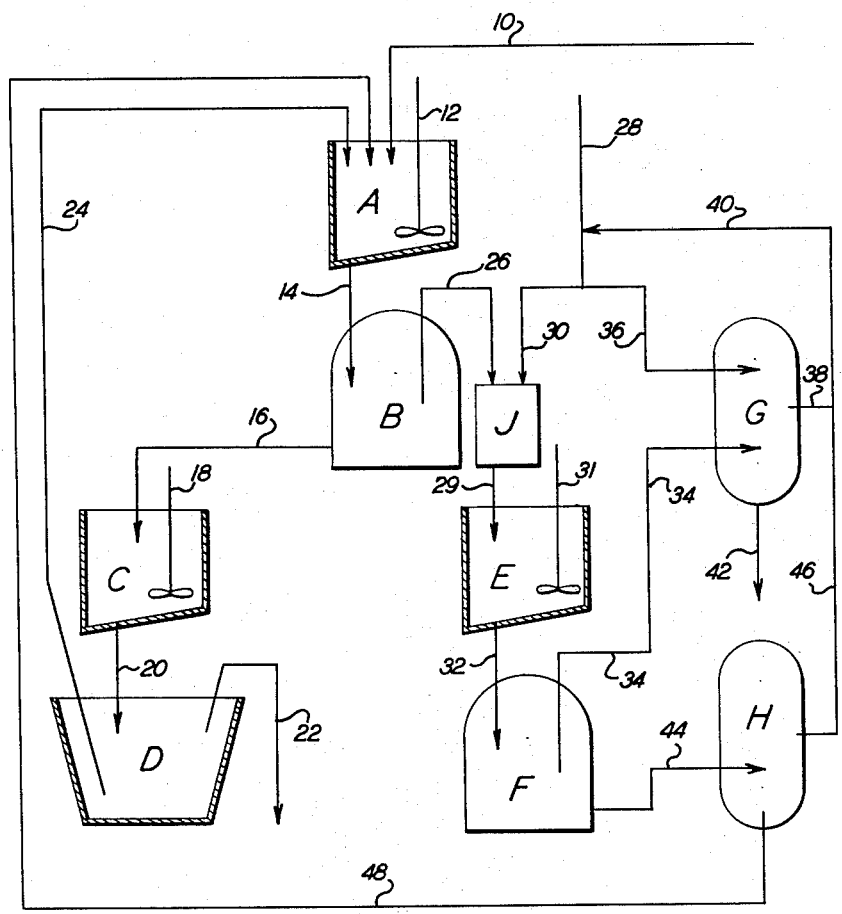
INVENTOR
THORPE DRESSER
BY *Adams Forward & McLean*
ATTORNEYS

3,113,982
PROCESS FOR DURENE RECOVERY BY CRYSTALLIZATION

Thorpe Dresser, Markham, Ill., assignor, by mesne assignments, to Sinclair Research, Inc., New York, N.Y., a corporation of Delaware
Filed Sept. 1, 1959, Ser. No. 837,537
13 Claims. (Cl. 260—674)

This invention is a process for separating durene from a hydrocarbon medium by crystallization. An important feature of the process is the removal of the bulk of the extraneous hydrocarbons by a two-step procedure which includes a gravitational type separation at about −80 to −20° F.

Durene is generally produced in admixture with other hydrocarbons by reforming a straight-run heavy naphtha, for example boiling above about 250° F., by alkylating aromatics, etc. The first-named method, after distillation of the product, frequently gives a hydrocarbon mixture containing a minor amount up to about 30% durene while the durene concentration in alkylate can be much greater. Such durene fractions produced by these and other methods contain a mixture of mostly aromatic hydrocarbons and may contain minor amounts of naphthalenes and paraffins. The aromatics usually include the close boiling durene homologs isodurene and prehnitene, from which it is difficult to separate the durene. Since durene differs from its homologs more in its melting point than any other physical characteristics, it may be separated by freezing it out from its mixture.

In the recovery of durene from its associated hydrocarbons, the processing scheme generally employs a low-temperature crystalilzation which is preceded by a distillation to remove most of the contaminants and which yields, as a typical case, a mixture boiling primarily from about 365 to 395° F. The concentration of durene in this mixture when obtained from reformate is generally in the range of about 10 to 20% by weight and when the mixture is chilled the first crystals will form at a temperature from about −10 to +45° F. As this temperature is lowered, pure durene will crystallize from the mixture to fairly low temperatures, say about −80° F. However, as the temperature is lowered, the new crystals formed tend to become smaller and smaller and the viscosity of the remaining liquid increases exponentially. Both small crystal size and increased viscosity complicate filtering, frequently dictating impractically long periods of time for the filtration to be performed, whether the filtration is done in a stationary filter, in a rotary filter under vacuum, or in a basket centrifuge. An alternative to prolonged filtration is holding the supercooled crude durene mixture for a prolonged period to allow crystal growth. This alternative is also unsatisfactory in that storage equipment of extreme capacity is required and enormous refrigeration machinery must be used. All of these factors serve to raise the price of durene to the consumer.

The process of this invention considerably speeds the separation of durene from its crude solution. The process comprises bringing the crude durene mixture to a temperature of about −10 to −40° F. to crystallize about 30 to 60%, preferably about 40 to 50% of the durene content, filtering in a first filtration zone, and cooling the filtrate further, to a temperature of at least about 10° F. lower than the first crystallization stage and generally in the range of about −30 to −100° F. to crystallize out further durene. This second mixture of crystals and liquid is then subjected to a gravitational-type separation, such as decantation or centrifugal sedimentation, which produces as a decantate or light portion a mixture containing about 3 to 5% durene with about 55 to 70% of the extraneous materials of the starting mixture, and a dregs or heavier portion containing about 18 to 25% durene. The decantate is discarded from the process and the dregs are blended with the crude durene mixture fed to the first cooling stage.

The filter cake from the first filtration stage contains some entrained impurities along with the durene. This cake can be subjected to a temperature of about −10 to +60° F. and filtered to recover a durene product in a second filter cake. The filtering steps and the gravitational separation are preferably accelerated by using centrifugal force; a basket centrifuge being used for each filtration and a solid-bowl centrifuge being used for the decantation. The decantate which is removed from the process frequently will contain so little durene that cooling of this liquid even to −50° F. or less will not produce any further durene crystals.

The first crystallization, cooling or freezing step is performed at a temperature of about −40 to −10° F., preferably about −30 to −10° F., and is followed by filtration at about −20 to +20° F., preferably at about −10 to +10° F. The cooling of this filtrate takes place at about −100 to −30° F., preferably at or below about −50° F. The decantation of the cooled filtrate takes place at about −80 to −20° F., preferably at about −75 to −45° F. The filter cake is held at a temperature of about −20 to +60° F., preferably about −20 to 0° F., and the filtration of the slurry produced by this holding is performed at about −20 to +75° F., preferably −10 to +15° F. In the separation steps the temperature is usually not permitted to rise more than about 40° F. above the temperature maintained in the preceding holding step. The filter cake from the first filtration is handled more easily when it is slurried with toluene or other aromatic hydrocarbon which is liquid at the temperature of the filter cake and the subsequent chilling.

The process of the invention will be better understood by reference to the accompanying schematic drawing in which A, C and E represent freezing or cooling zones, B and F are filtration zones, preferably where basket centrifuges are used, and D is a decanting or gravitational separation zone, preferably using a centrifugal-bowl separator. G and H are melting and/or flash distillation zones.

The crude durene-extraneous hydrocarbon mixture is conducted by line 10 to freezer A which may be provided with a stirrer 12. The final temperature maintained in this freezer is about −40 to −10° F., which is about 10 to 60° F. below the initial crystallization temperature of the durene. The supercooled slurry, containing solidified durene in crystalline form, passes through line 14 to filter B. The filtrate, diminished in durene content, is conducted by line 16 to freezer C, which may be provided with stirrer 18. In freezer C the temperature is held substantially lower than in freezer A, causing a further quantity of durene to crystallize. The slurry is then sent by line 20 to decanter D where it is separated into a heavy portion, the dregs, rich in durene, and a light portion, lean in durene. The lean portion may be conveniently removed from the processing apparatus to other uses or to waste through line 22. The dregs are returned to freezer A through line 24.

The filter cake from B is conducted by line 26 to melt tank J where it may be slurried with about 30 to 200% of an aromatic liquid such as toluene, as described above, from lines 28 and 30, and thence by line 29 to freezer E, which may be equipped with stirrer 31. A crystallization for further or final purification takes place in freezer E, and this slurry is conducted to the filter F, which separates a second filtrate from a second cake.

This second cake is sent through line 34 to the melt tank G where it is slurried with further liquid from line 36, and melted. Excess aromatic liquid is distilled off and recycled through lines 38 and 40. The unvaporized durene product is removed through line 42. The durene content of the second filtrate is recovered by passing the filtrate through line 44 to flash tower H where the aromatic liquid is removed for recycle through line 46. The remaining durene-hydrocarbon mixture can be recycled through line 48 back to the initial freezing zone A.

*Example*

An example of the use of the process is as follows:
The hydrocarbon mixture selected for recovery of durene is one boiling at about 385° F. It contains 1% naphthalenes, 6% paraffins and 93% aromatics including 15% durene as well as durene isomers. This mixture is fed at the rate of 2000 lbs./hour (300 lbs. durene/hour) to the process. The decantate discarded from the accelerated gravity separation step totals 1758.8 lbs./hour, of which 70.8 lbs. are durene and 1688.0 lbs. are extraneous hydrocarbon. The durene product recovered from the melting zone are 243.2 lbs./hour of which 229.2 lbs. are durene, 12 lbs. are extraneous hydrocarbon and 2.0 lbs. aromatic liquid—in this case toluene.

The 2000 lbs./hour feed, along with the dregs from the decantation step 257.8 lbs./hour durene and 968.9 lbs./hour extraneous hydrocarbon, and the filtrate from the second filtration 30.8 lbs./hour durene and 53.0 lbs./hour extraneous hydrocarbon, are fed to the first freezing stage and held in zone A until the temperature reaches −20° F. This slurry, totalling 588.6 lbs./hour durene and 2721.9 lbs./hour extraneous hydrocarbon is led to the first filtration stage and centrifuged at 0° F. to give 325 lbs./hour of cake which contains 260 lbs. durene and 65 lbs. extraneous hydrocarbon, while 2985.5 lbs./hour of filtrate containing 328.4 lbs. durene and 2657.1 lbs. extraneous hydrocarbon is sent to the second freezing stage. The filtrate is cooled to −90° F. and sent to decantation at −60° F. in a solid-bowl centrifuge to give the decantate and dregs reported above.

The 325 lbs./hour of cake from the first filtration is mixed with 758.3 lbs./hour of toluene in melt tank J and brought to −10° F. in the third freezing stage (stage E in the drawing). This slurried cake is then filtered at −6° F. in a basket centrifuge to give 288.2 lbs./hour of cake containing 229.2 lbs. durene, 12 lbs. extraneous hydrocarbon and 47 lbs. toluene. 353 pounds of toluene/hour are added to this cake to maintain the stream in the liquid phase for handling ease and upon vaporization of the toluene gives the yield reported above. The filtrate from the second centrifugation (stage F) totals 795.1 lbs./hour. The 711.3 lbs. of toluene is vaporized for recycle and the 30.8 lbs. of durene and 53.0 lbs. of extraneous hydrocarbon are returned to the first freezing step as reported above.

In this example the feedstock was a reformer distillate fraction boiling in the range of about 365° F. to 395° F. The process of this invention is applicable also to durene-containing feedstocks boiling primarily in the range of about 350 to 405° F. Such feedstocks are produced, for example, as naphtha reformate or in alkylation processes, such as where benzene or a lower-alkyl benzene containing a hydrogen atom attached directly to a nuclear carbon atom and an alkylating agent such as methanol or dimethyl ether are contacted in the presence of a cracking catalyst under elevated pressures of about 50 to 600 p.s.i.g. and at temperatures of about 500 to 900° F.

The advantages of the present invention, which uses a gravitational separation step to remove the bulk of the extraneous materials to recover remaining durene from the first filtration, are shown by a comparison of the results of the above example with the results of a durene recovery process using only filtration to separate the crystals. In such a process it was found that the filtrate from a filtration performed upon a durene-containing fraction which had been chilled to about −60 to −70° F., would produce further durene crystals when chilled again to merely −10° F., whereas the decantate discarded from the process of this invention did not produce any further durene even when chilled to −50° F.

I claim:
1. A method of separating durene from its mixture with aromatic hydrocarbons including durene isomers, the mixture boiling primarily in the range of about 350° F. to 405° F., which comprises bringing the durene mixture to a temperature of about −40 to −10° F. in a first cooling zone to produce a first slurry of durene-containing crystals, filtering the slurry to produce a first filtrate and a first filter cake, subjecting the said first filtrate in a second cooling zone to a temperature of at least about 10° F. lower than in the first cooling zone and in the range of about −100 to −30° F., subjecting the cooled filtrate to centrifugal decantation to separate a lighter fraction and a heavier fraction at about −80 to −20° F. to separate a lighter fraction and a heavier fraction, returning the durene-containing heavier fraction from the decantation to said first cooling zone, and recovering durene from the said first filter cake.

2. The process of claim 1 where the feed boils primarily in the range of about 365 to 395° F.

3. The process of claim 1 in which the filtration is accelerated by centrifugal force.

4. The process of claim 1 where the filtering is performed at about −20 to +20° F.

5. The process of claim 1 where the first filter cake is brought to a temperature of about −10 to +60° F. in a third cooling zone to produce a second slurry of durene-containing crystals and the second slurry is subjected to a second filtration to produce a second filtrate and a second filter cake.

6. The process of claim 5 where the first filter cake is slurried with a low-boiling hydrocarbon.

7. The process of claim 5 where the first filter cake is slurried with toluene.

8. The process of claim 5 where the second filtration is accelerated by centrifugal force.

9. A method of separating durene from its mixture with aromatic hydrocarbons including durene isomers, the mixture boiling primarily in the range of about 365° F. to 395° F., which comprises bringing the durene mixture to a temperature of about −40 to −10° F. in a first cooling zone to produce a first slurry of durene-containing crystals, centrifugally filtering the slurry at about −20 to +20° F. to produce a first filtrate and a first filter cake, subjecting the filtrate to a temperature in the range of about −100 to −50° F., subjecting the cooled filtrate to centrifugal decantation at about −80 to −20° F. to separate a lighter fraction and a heavier fraction, returning the durene-containing heavier fraction from the decantation to said first cooling zone, and recovering durene from the said first filter cake.

10. A method of separating durene from its mixture with aromatic hydrocarbons including durene isomers, the mixture boiling primarily in the range of about 365° F. to 395° F., which comprises bringing the durene mixture to a temperature of about −40 to −10° F. in a first cooling zone to produce a first slurry of durene-containing crystals, centrifugally filtering the slurry at about −20 to +20° F. to produce a first filtrate and a first filter cake, subjecting the filtrate to a temperature in the range of about −100 to −50° F., subjecting the cooled filtrate to centrifugal decantation at about −80 to −20° F. to separate a lighter fraction and a heavier fraction, returning the durene-containing heavier fraction from the decantation to said first cooling zone, bringing the said first filter cake to a temperature of about −10 to +60° F. in a third cooling zone to produce a second slurry of durene-containing crystals and subjecting said second slurry to a second filtration to produce a second filtrate and a second filter cake and recovering durene from the said second filter cake.

11. A method of separating durene from its mixture with aromatic hydrocarbons including durene isomers, the mixture boiling primarily in the range of about 365° F. to 395° F., which comprises bringing the durene mixture to a temperature of about −40 to −10° F. in a first cooling zone to produce a first slurry of durene-containing crystals, centrifugally filtering the slurry at about −20 to +20° F. to produce a first filtrate and a first filter cake, subjecting the filtrate to a temperature in the range of about −100 to −50° F., subjecting the cooled filtrate to centrifugal decantation at about −80 to −20° F. to separate a lighter fraction and a heavier fraction, returning the durene-containing heavier fraction from the decantation to said first cooling zone, slurrying the said first filter cake with a low-boiling hydrocarbon at a temperature of about −10 to +60° F. in a third cooling zone to produce a second slurry of durene-containing crystals, and subjecting said second slurry to a second filtration to produce a second filtrate and a second filter cake and recovering durene from the said second filter cake.

12. The process of claim 11 in which the low-boiling hydrocarbon is toluene.

13. The method of claim 1 in which the mixture of durene with aromatic hydrocarbons boiling in the range of about 350° F. to 405° F. contains about 10–30% durene.

References Cited in the file of this patent

UNITED STATES PATENTS

| | | |
|---|---|---|
| 2,769,852 | Paulson | Nov. 6, 1956 |
| 2,837,584 | Hoff | June 3, 1958 |
| 2,913,503 | Bozich et al. | Nov. 17, 1959 |
| 2,914,582 | Walker | Nov. 24, 1959 |
| 2,914,583 | Walker | Nov. 24, 1959 |